United States Patent [19]
Okada

[11] 3,771,742
[45] Nov. 13, 1973

[54] SELF-RETRACTING TYPE SEAT BELT DEVICE
[75] Inventor: Motohiro Okada, Tokyo, Japan
[73] Assignee: Honda Giken Kogyo Kabushiki Kaisha, Tokyo, Japan
[22] Filed: May 30, 1972
[21] Appl. No.: 258,085

[30] Foreign Application Priority Data
May 29, 1971 Japan.............................. 46/37180

[52] U.S. Cl......................... 242/107.4, 242/107 SB
[51] Int. Cl....................... A62b 35/00, B65h 77/00
[58] Field of Search..................... 242/107 R, 107.2, 242/107.3, 107.4, 107.7, 107 SB; 297/385, 386, 387, 388; 280/150 SB; 180/82 C

[56] References Cited
UNITED STATES PATENTS
3,294,339  12/1966  Fontaine........................ 242/107.4
3,266,842  8/1966   Board et al. ..................... 180/82 C
3,486,792  12/1969  Stoffel............................ 280/150 SB
3,240,510  3/1966   Spouge ........................... 242/107.4
3,172,700  3/1965   Haas................................ 297/385
3,610,361  10/1971  Pringle.......................... 280/150 SB Primary Examiner—Stanley N. Gilreath
Assistant Examiner—Jon W. Henry
Attorney—Eric H. Waters et al.

[57] ABSTRACT

A self-retracting type seat belt device in which, upon buckling of the seat belt, a belt winder is automatically caused to rotate initially so as to impart a suitable slack to the seat belt and is then locked to preclude any further extension or retraction of the seat belt.

10 Claims, 4 Drawing Figures

SELF-RETRACTING TYPE SEAT BELT DEVICE

BACKGROUND a. Field of the Invention

The present invention relates to safety seat belt devices for use in automobiles, trucks and like vehicles and more particularly to seat belt devices of the self-retracting type which include a belt winder normally spring-biased to wind up the seat belt with the intention of facilitating its application around the driver or passenger and preventing it from lying loose on the seat when not in use.

b. Prior Art

In any known form of safety seat belt device of the type described, the belt in use is continuously kept under an appreciable tension, pressing against the user's body causing discomfort.

SUMMARY OF THE INVENTION

The present invention is directed to the provision of a new and improved self-retracting type seat belt device which is free from the above-described difficulty encountered in previous devices of the same type.

Particularly, the present invention provides a self-retracting type seat belt device which comprises means for detecting completion of a belt applying operation by the user, means operable in response to the completion of the belt applying operation to cause the belt winder incorporated in the device to rotate in the belt-slackening direction so as to let out the seat belt a predetermined additional length, and means for locking the belt winder in the position it assumes with the seat belt so let out.

The construction and operation of the device of the present invention will next be described in detail with reference to the accompanying drawing, which illustrates one preferred embodiment of the invention.

DETAILED DESCRIPTION

Figure 1:
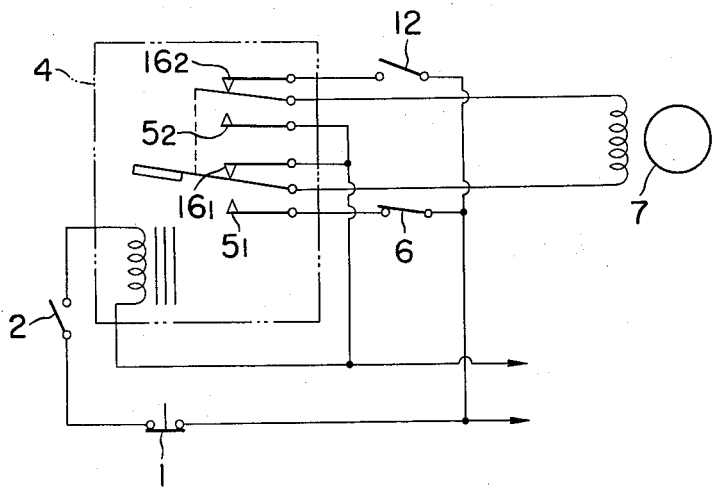
FIG. 1 is a schematic diagram showing the electric circuit arrangement of the device embodying the present invention.
Figure 2:
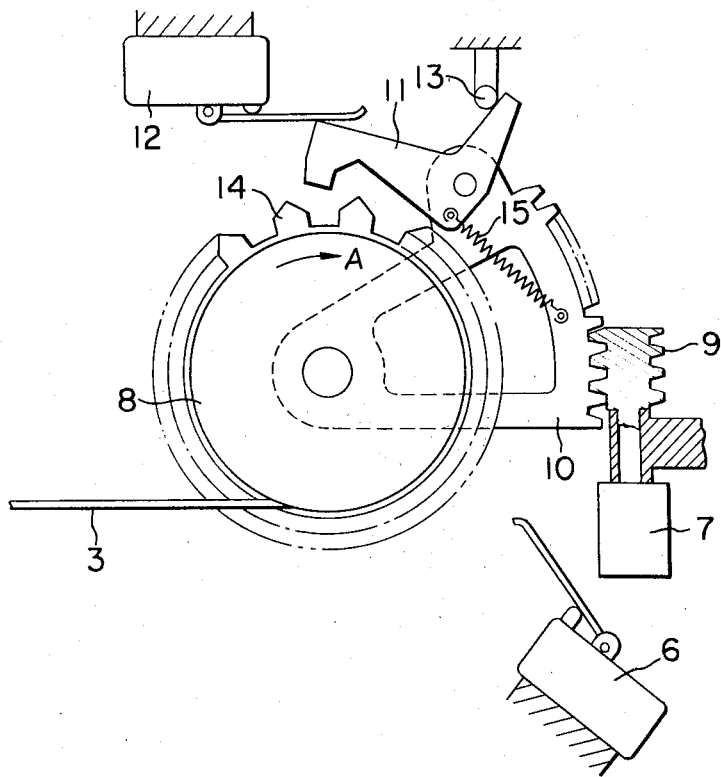
FIGS. 2 to 4 are diagrammatic illustrations of the device respectively showing the relationship of the component parts at successive stages of operation.
Figure 3:
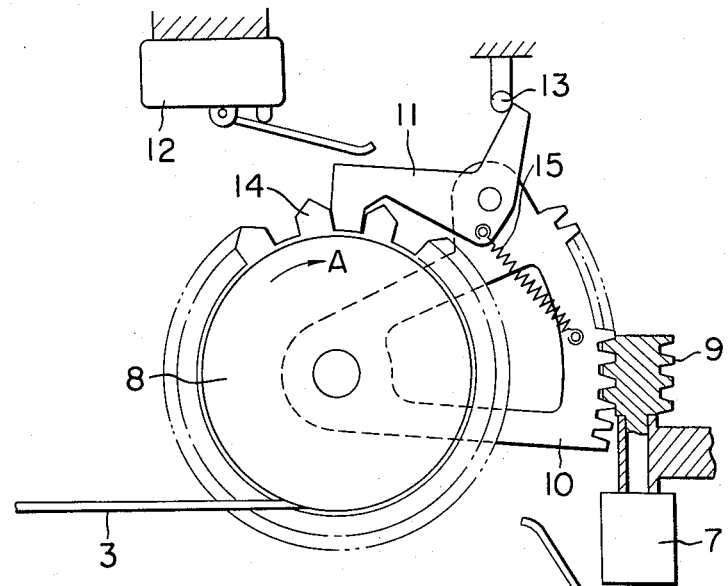
Figure 4:
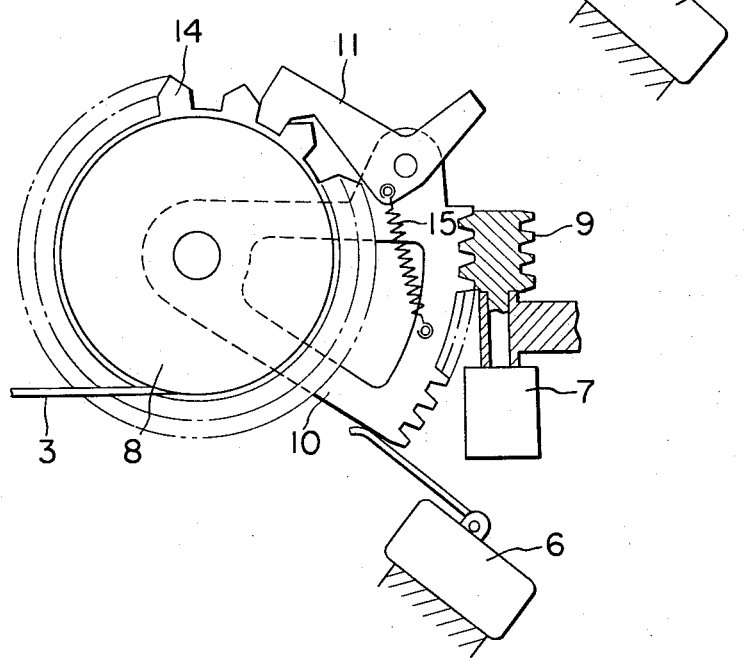

Referring to the drawing and first to the electric circuit diagram of FIG. 1, reference numeral 1 designates a normally closed switch (the purpose of which will be described hereinafter) and reference numeral 2 designates a switch closable upon engagement of the seat belt buckle. When the seat belt (indicated at 3 in FIG. 2) is pulled out and buckled up by the driver or passenger, the switch 2 is closed to operate a relay 4 in a manner so that its contacts $5_1$ and $5_2$ are closed to complete a motor circuit including a normally closed limit switch 6 and a motor 7. Accordingly, motor 7 is caused to rotate in a direction such as to turn a sector gear 10 clockwise i.e., in the direction indicated by the arrow A, through the intermediary of a worm gear 9. As shown, the sector gear 10 is mounted coaxially with a belt winder 8 and the belt 3 anchored to the belt winder is slackened or let out as the winder 8 rotates in the direction of arrow A.

A pawl lever 11 is pivotally mounted on the sector gear 10 and, as the sector gear starts turning clockwise, the pawl lever is moved to release another limit switch 12, which is inserted in the motor circuit. The limit switch 12 is normally held open by pawl lever 11 and upon release of lever 11 the limit switch 12 is allowed to close. The motor 7, however, continues to rotate in the same direction with the relay contacts $5_1$ and $5_2$ remaining closed. Meanwhile, the pawl lever 11 is released from a stop 13, which has previously been holding the pawl lever 11 out of engagement with a ratchet wheel 14 integral with winder 8. Upon release from stop 13, the pawl is brought into engagement with wheel 14 under the bias of a tension spring 15 whereby the belt winder 8 is now rotated by motor 7, in the belt-slackening direction A against the bias of the winder spring of winder 8.

Subsequently, when the seat belt has been let out a predetermined additional length giving to the seat belt only such a slight slack as not to impair its intended function of securing the user in place in case of an accidental stoppage of the vehicle, the sector gear 10 acts to open the normally closed limit switch 6 in the motor circuit thereby to stop the motor 7. As a result, the belt winder 8 is locked in its position through the intermediary of worm gear 9, sector gear 10, pawl 11 and ratchet wheel 14. In this state, if the user with the seat belt applied around his body desires to move, for example, to open or close the door of the vehicle, he can do so merely by opening the normally closed switch 1 thereby to restore the relay 4 to its normal state. In this manner, the belt winder is readily unlocked allowing the seat belt to be pulled out freely.

When the user unbuckles the seat belt in getting out of the vehicle, the switch 2 is opened and the relay 4 is operated to close contacts $16_1$ and $16_2$ so that the motor circuit (including closed switch 12) is closed and the motor 7 starts to rotate this time in the reverse direction to retract the seat belt. The sector gear 10 is thus returned together with the belt winder 8, allowing the limit switch 6 to return to its normally closed state. As the sector gear 10 reaches its initial position, the pawl lever 11 is brought into engagement with the stop 13 and is rocked out of engagement with the ratchet wheel 14 allowing the belt winder 8 to operate under its own spring bias. At the same time, the limit switch 12 is opened by the pawl lever 11 to restore the entire device to the initial state.

As apparent from the foregoing description, the self-retracting type seat belt device of the present invention is highly advantageous in that when the seat belt is buckled around the user, the belt winder is automatically driven to rotate a predetermined amount in the belt slackening direction thereby to relieve the user of any sense of pressure under the applied belt; and during its use the seat belt is fixed in the thus slackened state and therefore can fulfill its intended function of anchoring the user in place in case of sudden stoppage of the vehicle, as for example, in a collision.

While the invention has been shown in one preferred form, it is obvious to those skilled in the art that it is not so limited but is susceptible of various changes and modifications without departing from the spirit and scope of the claimed invention.

What is claimed is:

1. In a self-retracting type seat belt device having a belt winding drum biased by a spring for automatically winding up a seat belt, the seat belt being engageable by the user to be buckled and unbuckled, an improvement comprising means for detecting buckling of the belt, a locking means engagable with the winding drum including a base and a locking member supported on said base, means responsive to said detecting means for making said locking member into engagement with the belt winding drum for locking the same in rotation when the belt is buckled, and a slackening means for rotating said base and lacking member with said belt winding drum in a belt-slackening direction when said locking member is engaged with said belt winding drum so as to let out the seat belt a predetermined additional length.

2. The combination as claimed in claim 1 comprising means for releasing the locking means when the seat belt is unbuckled.

3. The combination as claimed in claim 2 comprising means for releasing the locking means while the seat belt remains buckled and operatively placed around the user.

4. A combination as claimed in claim 1 wherein the slackening means comprises a motor, a supply circuit for said motor including switch means which is closed upon buckling the belt, and means operatively coupling said motor and base for providing a driving connection therebetween when the switch means is closed.

5. A combination as claimed in claim 4 wherein said supply circuit comprises a relay controlled by operation of said switch means to connect said motor to a power supply such that the motor is driven in one direction when the seat belt is buckled and in opposite direction when the seat belt is unbuckled.

6. A combination as claimed in claim 4 wherein the base comprises a sector gear, the winder being rotatable about a given axis to retract and pay-out the seat belt, said sector gear being rotatably mounted on the belt winder for rotation about an axis coincident with said axis of rotation of the winder, a ratchet wheel fixed to the winder for rotation therewith, said locking member comprising a pivotal pawl lever on said sector gear engageable with said ratchet wheel to lock the sector gear and ratchet wheel together.

7. A combination as claimed in claim 6 wherein said supply circuit comprises a relay controlled by operation of said switch means to connect said motor to a power supply such that the motor is driven in one direction when the seat belt is buckled and in opposite direction when the seat belt is unbuckled, a second switch means controlled by operation of said pawl lever to close said circuit and ready the same for operation when the first said switch means is opened by unbuckling the seat belt and said relay is operated.

8. A combination as claimed in claim 7 comprising a third switch means connected in the supply cicuit to open said circuit when the sector gear has rotated a given amount and a predetermined length of belt has been paid-out.

9. A combination as claimed in claim 8 comprising a stop means positioned to engage said pivotal pawl lever and disconnect the lever from said ratchet wheel and also cause the lever to act on said second switch means when the seat belt is unbuckled.

10. In a self-retracting type seat belt device having a spring biassed belt winder for retracting a seat belt, the seat belt being engageable by the user to be operatively placed around the user and buckled in a belt applying operation and unbuckled in a belt releasing operation, an improvement comprising means for detecting buckling and unbuckling of the seat belt, means for rotating the belt winder in a belt-slackening direction to let out the seat belt a predetermined length when the first said means detects buckling of the belt, and means for locking the belt winder in the position it assumes when the predetermined length is let out.

* * * * *